United States Patent
Swenson et al.

(10) Patent No.: US 6,724,724 B1
(45) Date of Patent: Apr. 20, 2004

(54) SYSTEM AND METHOD FOR RESOLVING AN ELECTRONIC ADDRESS

(75) Inventors: Edward Swenson, San Jose, CA (US); Ravinder Amanaganti, San Jose, CA (US); Dhaval N. Shah, Santa Clara, CA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 09/234,928

(22) Filed: Jan. 21, 1999

(51) Int. Cl.[7] .......................... G01R 31/08; H04L 12/28; H04J 3/16
(52) U.S. Cl. ...................... 370/231; 370/401; 370/486; 709/230
(58) Field of Search ................................ 370/352, 356, 370/389, 392, 395.1, 401, 466, 467, 474, 231; 709/105, 203, 230; 710/105

(56) References Cited

U.S. PATENT DOCUMENTS

| | | | |
|---|---|---|---|
| 5,341,477 A | 8/1994 | Pitkin et al. | 395/200 |
| 5,430,727 A | 7/1995 | Callon | 370/85.13 |
| 5,450,394 A | 9/1995 | Gruber et al. | 370/17 |
| 5,459,837 A | 10/1995 | Caccavale | 395/184.04 |
| 5,473,599 A * | 12/1995 | Li et al. | 370/16 |
| 5,477,531 A | 12/1995 | McKee et al. | 370/17 |
| 5,479,494 A | 12/1995 | Clitherow | 379/144 |
| 5,509,123 A | 4/1996 | Dobbins et al. | 395/200.15 |
| 5,521,907 A | 5/1996 | Ennis, Jr. et al. | 370/17 |
| 5,548,506 A | 8/1996 | Srinivasan | 364/401 R |
| 5,603,029 A | 2/1997 | Aman et al. | 395/675 |
| 5,608,786 A | 3/1997 | Gordon | 379/100 |
| 5,751,961 A | 5/1998 | Smyk | 395/200.47 |
| 5,790,548 A * | 8/1998 | Sistanizadeh et al. | 370/401 |
| 5,793,763 A * | 8/1998 | Mayes et al. | 370/389 |
| 5,812,528 A | 9/1998 | VanDervort | 370/235 |

(List continued on next page.)

OTHER PUBLICATIONS

"Cisco Distributed Director", 1996, Cisco Systems, Inc.

Bolosky, William J. et al, "Distributed Schedule Management in the Tiger Video Fileserver", pp. 212–223, ACM Symposium on Operating Systems Principles, Oct., 1997, Saint Malo, France.

Dillon, Kevin, "PNNI: Effortless Expansion for ATM Networks", Dialog (R) File 647, ATM Forum Bay Networks, Nov. 7, 1998.

Gobrial, Margret N., "Evaluation of Border Gateway Protocol (BGP) Version 4 (V4) In the Tactical Environment", Oct. 21–24, 1996, Military Communications Conference, 1996.

Halabi, Bassam, Internet Routing Architectures (CISCO), Macmillan Technical Publishing, Apr. 23, 1997.

IBM Redbooks, "Setting Up and Implementing ADSTAR Distributed Storage Manager/400", Apr. 3, 1995.

(List continued on next page.)

Primary Examiner—Duc Ho
(74) Attorney, Agent, or Firm—Baker Botts L.L.P.

(57) ABSTRACT

A system and method according to an embodiment of the present invention for translating an electronic address is presented. The system and method comprises sending a first protocol specific address from a first device. A second protocol address is received by the first device, wherein the second protocol address has been determined to be associated with the first protocol specific address. Another system and method for translating an electronic address is also presented. The system and method comprises providing a first protocol specific address from a first device; determining a second protocol specific address associated with the first protocol specific address; and sending the second protocol address to the first device.

25 Claims, 3 Drawing Sheets

U.S. PATENT DOCUMENTS

| | | | | |
|---|---|---|---|---|
| 5,819,089 | A | 10/1998 | White | 395/676 |
| 5,870,557 | A | 2/1999 | Bellovin et al. | 709/224 |
| 5,894,556 | A | 4/1999 | Grimm et al. | 395/200 |
| 5,905,871 | A | 5/1999 | Buskens et al. | 395/200.75 |
| 5,917,820 | A | 6/1999 | Rekhter | 370/392 |
| 5,918,017 | A | 6/1999 | Attanasio et al. | 395/200.54 |
| 5,983,265 | A | 11/1999 | Martino, II | 709/206 |
| 5,991,809 | A | 11/1999 | Kriegsman | 709/226 |
| 6,003,079 | A | 12/1999 | Friedrich et al. | 709/224 |
| 6,006,264 | A | 12/1999 | Colby et al. | 709/226 |
| 6,009,081 | A | 12/1999 | Wheeler et al. | 370/255 |
| 6,018,516 | A | 1/2000 | Packer | 370/231 |
| 6,023,733 | A | 2/2000 | Periasamy et al. | 709/241 |
| 6,031,846 | A | 2/2000 | Gurusami et al. | 370/508 |
| 6,041,352 | A | 3/2000 | Burdick et al. | 709/224 |
| 6,070,190 | A | 5/2000 | Reps et al. | 709/224 |
| 6,078,590 | A | 6/2000 | Farinacci et al. | 370/432 |
| 6,078,956 | A | 6/2000 | Bryant et al. | 709/224 |
| 6,088,717 | A | 7/2000 | Reed et al. | 709/201 |
| 6,101,180 | A | 8/2000 | Donahue et al. | 370/352 |
| 6,115,711 | A | 9/2000 | White | 707/10 |
| 6,115,752 | A | 9/2000 | Chauhan | 709/241 |
| 6,118,765 | A | 9/2000 | Phillips | 370/235 |
| 6,205,139 | B1 * | 3/2001 | Voit | 370/389 |
| 6,243,374 | B1 * | 6/2001 | White et al. | 370/352 |
| 6,272,523 | B1 * | 8/2001 | Factor | 709/201 |

OTHER PUBLICATIONS

Inan, Kemal, "Supervisory Control and the Gateway Problem", Jun. 4, 1993, IEEE Colloquium on Discrete Event Systems.

Kosiur, IP Multicasting: The Complete Guide Interactive Corporate Networks, Wiley Computer Publishing, Apr. 1, 1998.

Liu, Zhao, et al., "A Scalable Wireless Virtual LAN", International Conference on Mobile Computing and Neetworking, Nov. 11–12, 1996, White Plains, NY, pp. 176–186.

Morrissey, Peter, "Multihoming With BGP4", Network Computing, 1999, No. 1025, p. 117.

Chapter 2.2 PING of TCP RFC 1739 available at www.ietf.org or ftp://ftp/isi.edu/in–notes/rfc 1739.txt.

Shiner, Mitchell, "Scott Meuller Library—Computer Dictionary", Que, Macmillan Computer Publishing, May 20, 1998.

Smith, Bradley R., et al, "Securing the Border Gateway Routing Protocol", Global Telecommunications Conference, 1996, Nov. 18–22, 1996.

Tsuchiya, Paul F., "Internet Routing over Large Public Data Networks using Shortcuts", Bellcore, tsuchiya@thumper.bellcore.com.

* cited by examiner

SYSTEM AND METHOD FOR RESOLVING AN ELECTRONIC ADDRESS

FIELD OF THE INVENTION

The present invention is related to communication over a computer network. In particular, the present invention relates to translating an address from one protocol to another in a network environment.

BACKGROUND OF THE INVENTION

A network is a data communication system that links two or more computers and peripheral devices. It may allow users to access resources on other computers and exchange messages with other users. A network may allow users to share resources on their own systems with other network users and to access information on centrally located systems or systems that are located at remote offices. It may provide connections to the Internet or the networks of other organizations. Users may interact with network-enabled software applications to make a network request (such as to get a file or print on a network printer). The application then communicates with the network software and the network software interacts with the network hardware. The network hardware is typically responsible for transmitting information to other devices attached to the network.

Figure 1:
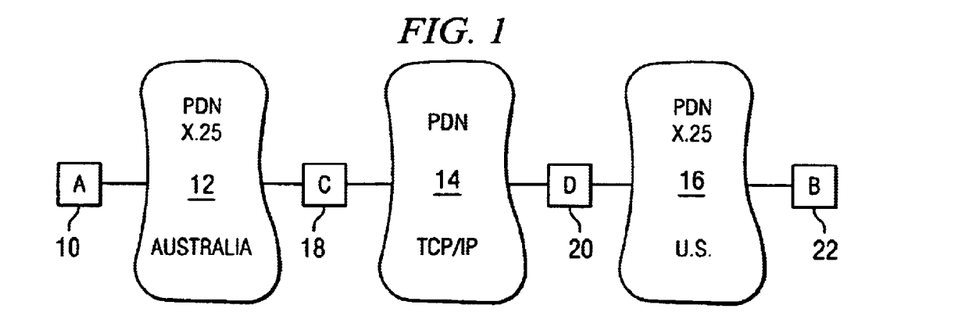
FIG. 1 is a diagram of an example of a multi-network system.

It is now common to communicate by establishing a connection through two or more networks, such as through the Internet. These various networks may use different communication protocols (packet data protocols) from each other, but should still be able to communicate with each other. For example, FIG. 1 shows various networks 12–16 coupled with various devices 10, 18–22. Assume that device 10 is attempting to communicate with device 22. Devices 10 and 22 may be hosts with protocol specific addresses, such as X.25 protocol specific addresses. Between device 10 and device 22 are network 12, router 18, network 14, router 20, and network 16.

Each of the networks may work with a selected packet data protocol. Examples of packet data protocols include transmission control protocol/Internet protocol (TCP/IP), X.25, Asynchronous Transfer Mode (ATM), frame relay, and Network Service Access Point (NSAP). These are examples of wide area network (WAN) protocols. WANs may link geographically dispersed offices in other cities or around the globe. Practically any long distance communication medium can serve as a WAN link, including switched and permanent telephone circuits, terrestrial radio systems, and satellite systems. For example, the network 12 may be located in Australia, while network 16 may be located in the U.S., with a connection through a third network 14, such as the Internet or a third party network.

In this example, network 12 and network 16 uses X.25 protocol, while network 14 uses TCP/IP. An IP address uniquely identifies a device in the network. This IP address identifies the device in TCP/IP. However, the same device may also have another protocol specific address, such as an X.25 address (sometimes referred to as an x.121 address) which uniquely identifies that device in the X.25 network. Accordingly, devices 10 and 22 may each have multiple addresses uniquely identifying that device in various protocols.

When device 10 attempts to establish communication with device 22, device 10 may identify or obtain device 22's X.25 address and contact network 12. From network 12, communication should be established to network 14, then to network 16 to establish communication with device 22. However, since network 12 utilizes X.25 protocol and network 14 utilizes TCP/IP, router 18 must typically translate device 22's address from its X.25 address to its TCP/IP address. Likewise, if device 22 was attempting to establish communication with device 10, then router 20 would translate the X.25 address for device 10 into a TCP/IP address for device 10.

Each router 18, 22 typically maintains a table of address translations, such as the translation of device 22's X.25 address to device 22's TCP/IP address. These addresses are typically hard coded into the routers 18–20. Accordingly, if an address for a device changes, then each router 18–20 that includes that device's address will typically need to be accessed and the address will have to be changed. Since it is fairly common for a network to have its address scheme changed, it may be substantially time consuming to ensure that each router that contained each of the changed addresses is accessed and updated. Additionally, the process of individually changing an address in all the routers that maintain that address may be error prone.

It would be desirable to have an address resolution system and method that allows dynamic changes to addresses and avoid the need to access each router containing the address to change that address. The present invention addresses such a need.

SUMMARY OF THE INVENTION

A method according to an embodiment of the present invention for translating an electronic address is presented. The method comprises sending a first protocol specific address from a first device. A second protocol address is received by the first device, wherein the second protocol address has been determined to be associated with the first protocol specific address.

A system according to an embodiment of the present invention for translating an electronic address is also presented. The system comprises a processor configured to send a first protocol specific address, the processor also configured to receive a second protocol specific address that has been determined to be associated with the first protocol specific address. The system also includes a network interface coupled to the processor configured to interface with a network.

Another system for translating an electronic address according to an embodiment of the present invention is also presented. The system comprises a processor configured to receive a first protocol specific address from a first device. The processor is also configured to determine a second protocol specific address associated with the first protocol specific address, and to send the second protocol address to the first device. The system also includes a memory to provide instructions to the processor.

Another method for translating an electronic address is also presented. The method comprises providing a first protocol specific address from a first device; determining a second protocol specific address associated with the first protocol specific address; and sending the second protocol address to the first device.

DETAILED DECRIPTION OF THE DRAWINGS

The following description is presented to enable one of ordinary skill in the art to make and to use the invention and is provided in the context of a patent application and its requirements. Various modifications to the preferred embodiments will be readily apparent to those skilled in the art and the generic principles herein may be applied to other embodiments. Thus, the present invention is not intended to be limited to the embodiment shown but is to be accorded the widest scope consistent with the principles and features described herein.

Figure 2:
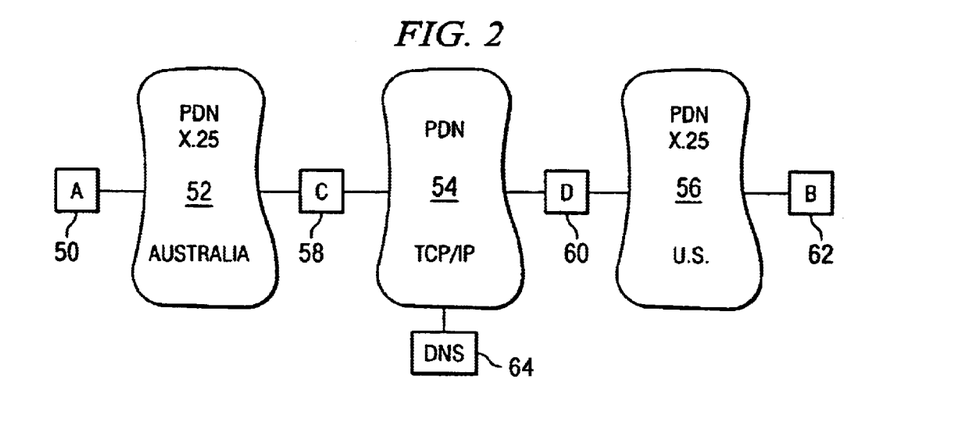
FIG. 2 is a diagram of an example of a multi-network system suitable for implementing an embodiment of the present invention.

FIG. 2 shows an example of a network system suitable for implementing an embodiment of the present invention. In the system shown in FIG. 2, a device 50 is shown to be coupled with a packet data network 52 which is also coupled with a router 58. The router 58 is also shown to be coupled with another packet data network 54 which in turn is also coupled with another router 60. Router 60 is also shown to be coupled with another packet data network 56 which is coupled with device 62. A name resolution service, such as a domain name server (DNS) 64, is also shown to be coupled with network 54. Note that DNS 64 may be coupled with any of the networks 52–56, however, the DNS 64 is shown to be coupled with network 54 in this example.

Devices 50 and 62 may be any computer device such as an end-user computer device or host, or they may be routers. Networks 52 and 56 may use any packet data protocol, such as transmission control protocol/Internet protocol (TCP/IP), X.25, Asynchronous Transfer Mode (ATM), frame relay, and Network Service Access Point (NSAP). Assume in this example that network 52 and network 56 uses X.25 protocol, while network 54 uses TCP/IP. If device 50 attempts to establish communication with device 62, then device 50 may send an X.25 address, identifying device 62, to network 52. The X.25 address is then forwarded to router 58. According to an embodiment of the present invention, router 58 then contacts name resolution service, such as DNS 64, with device 62's X.25 address. DNS 64 then translates the X.25 address to a corresponding TCP/IP address, both of which identifies device 62. DNS 64 then returns router 60's TCP/IP address to router 58. With the TCP/IP address of router 60, router 58 may then navigate the information through network 54 to router 60. Router 60 may then navigate the information through network 56, and to device 62. Once the communication is established between device 50 and device 62, no further address translations are required. Likewise, if device 62 attempts to establish communication with device 50, then router 60 would contact DNS 64 for a translation of device 50's X.25 address into a corresponding TCP/IP address for device 50. For this example, further details of the X.25 over TCP/IP (XOT) translation may be found in Request For Comment (RFC) 1613 standard.

Figure 3:
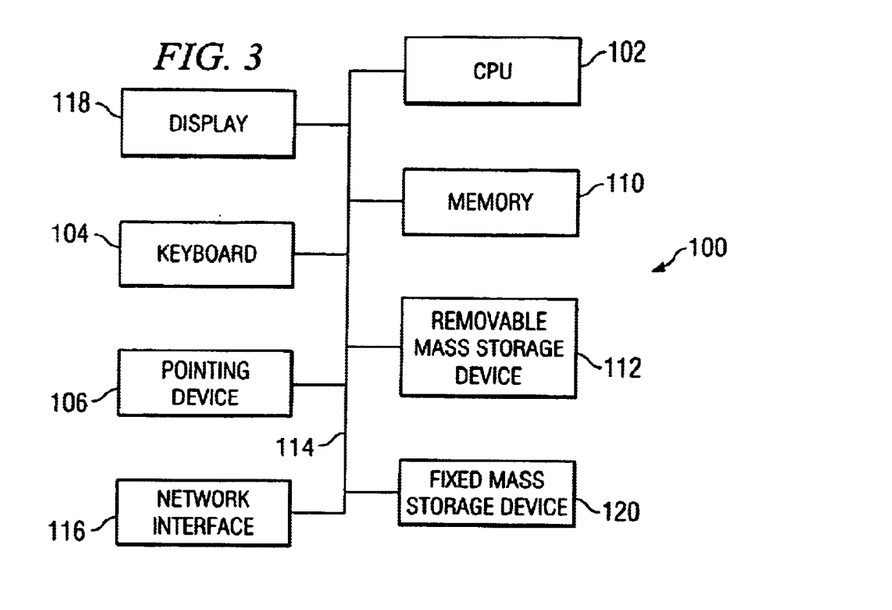
FIG. 3 is a block diagram of a computer system suitable for implementing an embodiment of the present invention.

FIG. 3 is a block diagram of a computer system suitable for implementing an embodiment of the present invention. The system shown in FIG. 3 may be used as a name resolution service, such as DNS 64 show in FIG. 2. An example of a DNS software is BIND by University of California, Berkeley. FIG. 3 illustrates one embodiment of a general purpose computer system. Other computer system architectures and configurations can be used for carrying out the processing of the present invention.

Computer system 100, made up of various subsystems described below, includes at least one microprocessor subsystem (also referred to as a central processing unit, or CPU) 102. That is, CPU 102 can be implemented by a single-chip processor or by multiple processors. CPU 102 is a general purpose digital processor which controls the operation of the computer system 100. Using instructions retrieved from memory 110, the CPU 102 controls the reception and manipulation of input data, and the output and display of data on output devices.

CPU 102 is coupled bi-directionally with memory 110 which can include a first primary storage, typically a random access memory (RAM), and a second primary storage area, typically a read-only memory (ROM). As is well known in the art, primary storage can be used as a general storage area and as scratch-pad memory, and can also be used to store input data and processed data. It can also store programming instructions and data, in the form of data objects and text objects, in addition to other data and instructions for processes operating on CPU 102. Also as well known in the art, primary storage typically includes basic operating instructions, program code, data and objects used by the CPU 102 to perform its functions. Primary storage devices 110 may include any suitable computer-readable storage media, described below, depending on whether, for example, data access needs to be bi-directional or uni-directional. CPU 102 can also directly and very rapidly retrieve and store frequently needed data in a cache memory (not shown).

A removable mass storage device 112 provides additional data storage capacity for the computer system 100, and is coupled either bi-directionally or uni-directionally to CPU 102. For example, a specific removable mass storage device commonly known as a CD-ROM typically passes data uni-directionally to the CPU 102, whereas a floppy disk can pass data bi-directionally to the CPU 102. Storage 112 may also include computer-readable media such as magnetic tape, flash memory, signals embodied on a carrier wave, PC-CARDS, portable mass storage devices, holographic storage devices, and other storage devices. A fixed mass storage 120 can also provide additional data storage capacity. The most common example of mass storage 120 is a hard disk drive. Mass storage 112, 120 generally store additional programming instructions, data, and the like that typically are not in active use by the CPU 102. It will be appreciated that the information retained within mass storage 112, 120 may be incorporated, if needed, in standard fashion as part of primary storage 110 (e.g. RAM) as virtual memory.

In addition to providing CPU 102 access to storage subsystems, bus 114 can be used to provide access other subsystems and devices as well. In the described embodiment, these can include a display monitor 118, a network interface 116, a keyboard 104, and a pointing device 106, as well as an auxiliary input/output device interface, a sound card, speakers, and other subsystems as needed. The pointing device 106 may be a mouse, stylus, track ball, or tablet, and is useful for interacting with a graphical user interface.

The network interface 116 allows CPU 102 to be coupled to another computer, computer network, or telecommunications network using a network connection as shown. Through the network interface 116, it is contemplated that the CPU 102 might receive information, e.g., data objects or program instructions, from another network, or might output information to another network in the course of performing the above-described method steps. Information, often represented as a sequence of instructions to be executed on a CPU, may be received from and outputted to another network, for example, in the form of a computer data signal embodied in a carrier wave. An interface card or similar device and appropriate software implemented by CPU 102 can be used to connect the computer system 100 to an external network and transfer data according to standard protocols. That is, method embodiments of the present invention may execute solely upon CPU 102, or may be performed across a network such as the Internet, intranet networks, or local area networks, in conjunction with a remote CPU that shares a portion of the processing. Additional mass storage devices (not shown) may also be connected to CPU 102 through network interface 116.

An auxiliary I/O device interface (not shown) can be used in conjunction with computer system 100. The auxiliary I/O device interface can include general and customized interfaces that allow the CPU 102 to send and, more typically, receive data from other devices such as microphones, touch-sensitive displays, transducer card readers, tape readers, voice or handwriting recognizers, biometrics readers, cameras, portable mass storage devices, and other computers.

In addition, embodiments of the present invention further relate to computer storage products with a computer readable medium that contain program code for performing various computer-implemented operations. The computer-readable medium is any data storage device that can store data which can thereafter be read by a computer system. The media and program code may be those specially designed and constructed for the purposes of the present invention, or they may be of the kind well known to those of ordinary skill in the computer software arts. Examples of computer-readable media include, but are not limited to, all the media mentioned above: magnetic media such as hard disks, floppy disks, and magnetic tape; optical media such as CD-ROM disks; magneto-optical media such as floptical disks; and specially configured hardware devices such as application-specific integrated circuits (ASICs), programmable logic devices (PLDs), and ROM and RAM devices. The computer-readable medium can also be distributed as a data signal embodied in a carrier wave over a network of coupled computer systems so that the computer-readable code is stored and executed in a distributed fashion. Examples of program code include both machine code, as produced, for example, by a compiler, or files containing higher level code that may be executed using an interpreter.

The computer system shown in FIG. 3 is but an example of a computer system suitable for use with the invention. Other computer systems suitable for use with the invention may include additional or fewer subsystems. In addition, bus 114 is illustrative of any interconnection scheme serving to link the subsystems. Other computer architectures having different configurations of subsystems may also be utilized.

Figure 4:
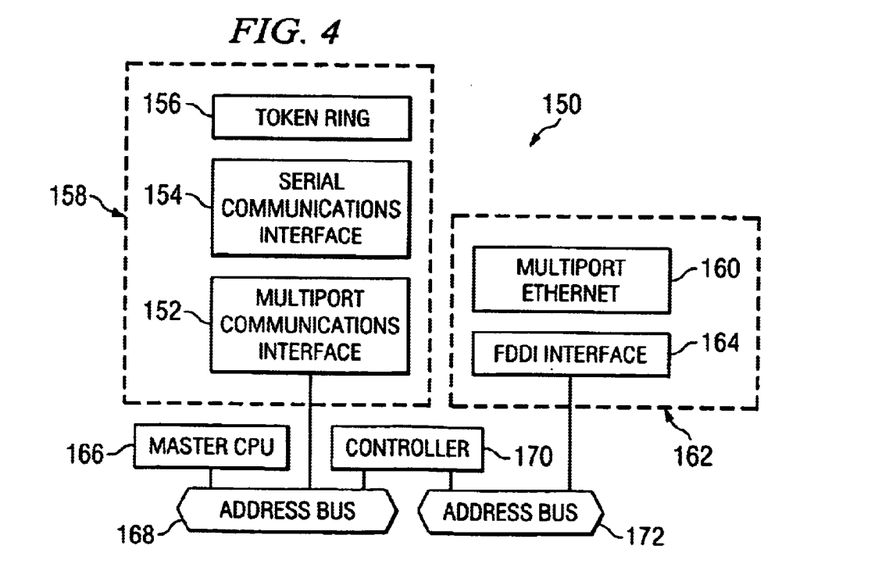
FIG. 4 is a block diagram of an example of a router suitable for implementing an embodiment of the present invention.

FIG. 4 is a block diagram of an example of a router, such as routers 58 and 60 of FIG. 2, suitable for implementing an embodiment of the present invention. Router 150 is shown to include a master central processing unit (CPU) 166, low and medium speed interfaces 158, and high speed interfaces 162. The CPU 166, may be responsible for such router tasks as routing table computations and network management. It may include one or more microprocessor chips selected from complex instruction set computer (CISC) chips (such as the Motorola 68040 Microprocessor), reduced instructions set computer (RISC) chips, or other available chips. Non-volatile RAM and/or ROM may also form part of CPU 166. However, there are many different ways in which memory can be coupled to the system.

The interfaces 158 and 162 are typically provided as interface cards. Generally, they control the sending and receipt of data packets over the network and sometimes support other peripherals used with the router 150. Examples of interfaces that may be included in the low and medium interfaces 158 include a multiport communications interface 152, a serial communications interface 154, and a token ring interface 156. Examples of interfaces that may be included in the high speed interfaces 162 include a fiber distributed data interface (FDDI) 164 and a multiport ethernet interface 160. Each of these interfaces (low/medium and high speed) may include (1) a plurality of ports appropriate for communication with the appropriate media, and (2) an independent processor such as the 2901 bit slice processor (available from Advanced Micro Devices Corporation of Santa Clara, Calif.), and in some instances (3) volatile RAM. The independent processors control such communication intensive tasks as packet switching and filtering, and media control and management. By providing separate processors for the communication intensive tasks, this architecture permits the master microprocessor 166 to efficiently perform routing computations, network diagnostics, security functions, etc.

The low and medium speed interfaces are shown to be coupled to the master CPU 166 through a data, control, and address bus 168. High speed interfaces 162 are shown to be connected to the bus 168 through a fast data, control, and address bus 172 which is in turn connected to a bus controller 170. The bus controller functions are provided by a processor such as a 2901 bit slice processor.

Although the system shown in FIG. 4 is an example of a router suitable for implementing an embodiment of the present invention, it is by no means the only router architecture on which the present invention can be implemented. For example, an architecture having a single processor that handles communications as well as routing computations, etc. would also be acceptable. Further, other types of interfaces and media could also be used with the router.

Figure 5:
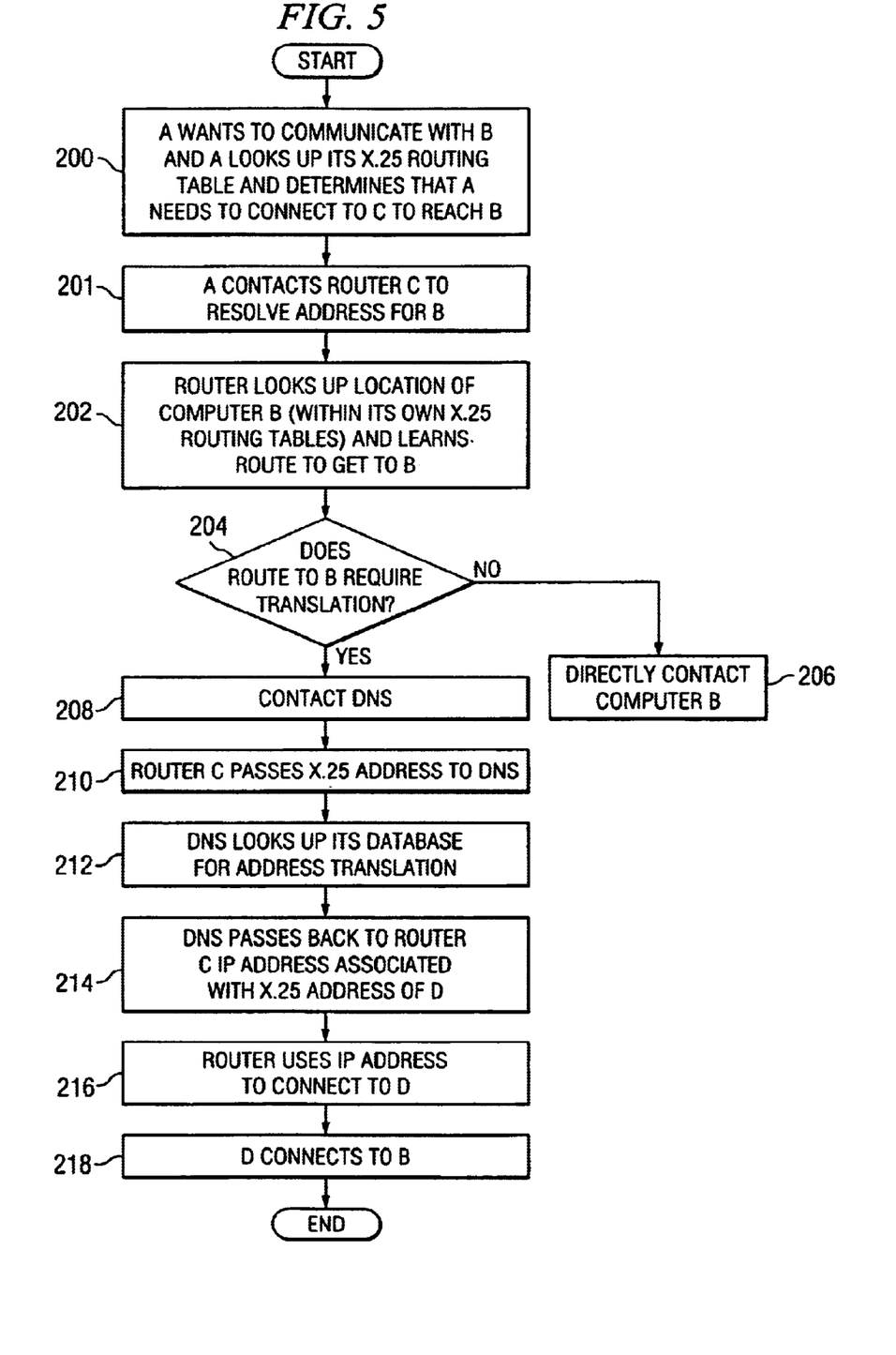
FIG. 5 is a flow diagram of a method according to an embodiment of the present invention for resolving a protocol specific address to another protocol specific address.

FIG. 5 is a flow diagram of a method according to an embodiment of the present invention for resolving a first protocol specific address to another protocol specific address. In this example, assume that a device A is attempting to establish communication with a device B. Device A looks up its own X.25 routing table and determines that it needs to connect to C to reach B (step 200). Device A contacts a router, such as router C in this example, to resolve a protocol specific address for device B (step 201). The router looks up a location of device B and learns the route to contact device B (step 202). The router may look up its own routing tables for this information. For example, if device A contacted the router with an X.25 address for device B, then the router would look up its own X.25 routing tables located within the router itself for the information.

It is then determined whether the route to device B requires a translation of the received address for device B (step 204). When the router looks up the location of device B, information related to the path to device B is also learned. Accordingly, it may be determined as to whether the route to device B requires a translation of the protocol specific address for device B. For example, a translation may be required if the received address for device B is an X.25 address but the route to device B includes a network using a non-X.25 protocol, such as a network using TCP/IP.

If no translation is required, then device B is directly contacted (step 206). If, however, the route to device B does require translation, then a name resolution service, such as a domain name server (DNS) is contacted (step 208). The DNS which is contacted by the router may be a DNS local to the router, or a specific DNS identified in the router's routing table that contains the information to facilitate the address translation. Accordingly, only a relatively small number of DNSs would require updates of changes of addresses in order to dynamically affect all routers requesting that address.

Router C passes the protocol specific address, such as the X.25 address, to the DNS (step 210). The DNS then looks up its database for an address translation of the protocol specific address (step 212). For example, the DNS may look up its database for an address translation of an X.25 address to an associated TCP/IP address. Normally, a DNS is typically used to resolve a host name to a TCP/IP address. For example, a host name such as www.cisco.com may be resolved by a DNS to a TCP/IP address such as 192.21.23.45. This resolution is typically performed by looking up a table in the DNS that associates the host name to a TCP/IP address. In this embodiment of the invention, the DNS is used to translate one protocol specific address to another protocol specific address by replacing the host name information with a protocol specific address. Accordingly, a protocol specific address, such as an X.25 address, may be translated to a TCP/IP address. Additionally, the IP address portion of the table may also be substituted by another protocol specific address, such as an ATM address.

When the DNS is used to resolve host names, a router typically needs to be configured such that each host name triggers a query to the DNS. For example host names such as ed.cisco.com, joe. cisco.com, and bill.cisco.com would each need to be configured to be recognized by the router as a name that should be queried to the DNS for a corresponding IP address. However, when the DNS is used to translate one protocol specific address to another protocol specific address, as in an embodiment of the present invention, then the router may be configured such that any address with a portion matching a predetermined criteria may be sent out to the DNS. For example, the router may be configured to send all addresses that match a predetermined criteria of 12$x$, wherein x is a variable. When the router receives protocol specific addresses 123, 124, and 125, they would all match the predetermined criteria, and all three addresses 123, 124, and 125 may be sent to the DNS to be translated into other protocol specific addresses that correspond to the original three addresses. Accordingly, an advantage of using the DNS to translate one protocol specific address to another protocol specific address is the ability to configure the router more easily to access the DNS.

An advantage of using a name resolution service, such as a DNS, is that virtually all the features of the DNS may be utilized. For example, since load balancing is an available feature of a DNS, the DNS may provide an address translation based on load balancing. The load balancing address translation may be such that a device requesting a particular web site by a protocol specific address may be given another protocol specific address for another web site that is a mirrored web site of the requested address. The mirrored web site may have less load at the time of the request and thus be a better selection.

The DNS then passes back to router C the translated protocol specific address, such as a TCP/IP address, associated with the first protocol specific address, such as the X.25 address of device D (step 214). The router receives the translated address and uses the translated address to connect to the next device, such as router D (step 216). Then the intervening device may connect to the requested device B (step 218).

A method and system for translating a protocol specific address to another protocol specific address has been disclosed. Software written according to the present invention may be stored in some form of computer-readable medium, such as memory or CD-ROM, or transmitted over a network, and executed by a processor.

Although the present invention has been described in accordance with the embodiment shown, one of ordinary skill in the art will readily recognize that there could be variations to the embodiment and these variations would be within the spirit and scope of the present invention. Accordingly, many modifications may be made by one of ordinary skill in the art without departing from the spirit and scope of the appended claims.

What is claimed:

1. A method for directing traffic in a network environment, comprising:

receiving a request initiated by a first network device at a second network device that is operable to communicate with a third network device, wherein the request is used to establish a communication session between the first network device and a fourth network device, and wherein the first and second network devices are coupled to a first network, the second and third network devices being coupled to a second network, the third and fourth network devices being coupled to a third network, the first and third networks being associated with a first protocol and the second network being associated with a second protocol;

evaluating a route associated with a data flow path between the first and fourth network devices;

determining, based on the data flow path, whether a translation of an address that identifies the fourth network device from the first protocol to the second protocol should be executed;

directing the communication session to the second network device when the translation should not be executed in order to establish the data flow path; and accessing a name resolution service element if the translation should be executed in order to translate the address from the first protocol to the second protocol such that information exchange in the data flow path is achieved between the first and fourth network devices.

2. The method of claim 1, further comprising:

accessing a table within the name resolution service element in order to resolve the address to a selected one of the first and second protocols.

3. The method of claim 2, further comprising:

updating the table in the name resolution service element such that one or more addresses stored in the table may be resolved into a selected one of the first and second protocols.

4. The method of claim 1, further comprising:

receiving instructions designating how to process the request to establish the communication session between the first and fourth network devices.

5. The method of claim 1, further comprising:

providing an interface between the name resolution service element and one or more of the network devices in order to communicate instructions associated with processing the request.

6. The method of claim 1, further comprising:

displaying information, at the name resolution service element, associated with the request to establish the communication session between the first network device and the fourth network device.

7. The method of claim 1, wherein evaluating the route associated with the data flow path between the first and fourth network devices is executed by a router, and wherein the router is operable to additionally execute a selected one of the group of operations consisting of:

packet filtering;

packet switching;

media control; and packet management.

8. The method of claim 7, wherein the router is further operable to execute a selected one of the group of operations consisting of:

routing computations;

network diagnostics; and security functions.

9. A computer readable medium for directing traffic in a network environment, the medium comprising code operable to:

receive a request initiated by a first network device at a second network device that is operable to communicate with a third network device, wherein the request is used to establish a communication session between the first network device and a fourth network device, and wherein the first and second network devices are coupled to a first network, the second and third network devices being coupled to a second network, the third and fourth network devices being coupled to a third network, the first and third networks being associated with a first protocol and the second network being associated with a second protocol;

evaluate a route associated with a data flow path between the first and fourth network devices;

determine, based on the data flow path, whether a translation of an address identifies the fourth network device from the first protocol to the second protocol should be executed;

direct the communication session to the second network device when the translation should not be executed in order to establish the data flow path; and access a name resolution service element if the translation should be executed in order to translate the address from the first protocol to the second protocol such that information exchange in the data flow path is achieved between the first and fourth network devices.

10. The medium of claim 9, further operable to:

access a table within the name resolution service element in order to resolve the address to a selected one of the first and second protocols.

11. The medium of claim 10, further operable to:

update the table in the name resolution service element such that one or more addresses stored in the table may be resolved into a selected one of the first and second protocols.

12. The medium of claim 9, further operable to:

receive instructions designating how to process the request to establish the communication session between the first and fourth network devices.

13. The medium of claim 9, further operable to:

display information associated with the request to establish the communication session between the first network device and the fourth network device.

14. A computer device for directing traffic in a network environment, comprising:

one or more interface cards operable to receive a request initiated by a first network device at a second network device that is operable to communicate with a third network device, wherein the request is used to establish a communication session between the first network device and a fourth network device, and wherein the first and second network devices are coupled to a first network, the second and third network devices being coupled to a second network, the third and fourth network devices being coupled to a third network, the first and third networks being associated with a first protocol and the second network being associated with a second protocol; and a processor operable to evaluate a route associated with a data flow path between the first and second network devices and to determine, based on the data flow path, whether a translation of the address from the first protocol to the second protocol should be executed, wherein the communication session is directed to the second network device when the translation should not be executed in order to establish the data flow path, and wherein a name resolution service element is accessed if the translation should be executed in order to translate the address from the first protocol to the second protocol such that information exchange in the data flow path is achieved between the first and fourth network devices.

15. The computer device of claim 14, wherein a table within the name resolution service element is accessed in order to resolve the address to a selected one of the first and second protocols.

16. The computer device of claim 15, wherein the table in the name resolution service element is updated such that one or more addresses stored in the table may be resolved into a selected one of the first and second protocols.

17. The computer device of claim 14, wherein one or more of the interface cards receive instructions designating how to process the request to establish the communication session between the first and fourth network devices.

18. The computer device of claim 14, wherein the computer device is a router, and wherein the router is operable to execute a selected one of a group of operations consisting of:

packet filtering;

packet switching;

media control; and packet management.

19. The computer device of claim 18, wherein the router is further operable to execute a selected one of a group of operations consisting of:

routing computations;

network diagnostics; and security functions.

20. An apparatus for directing traffic in a network environment, comprising:

a name resolution service element operable to provide a resolution of an address from a first protocol to a second protocol, wherein a request initiated by a first network device is received at a second network device that is operable to communicate with a third network device, the request being used to establish a communication session between the first network device and a fourth network device, the first and second network devices being coupled to a first network, the second and third network devices being coupled to a second network, the third and fourth network devices being coupled to a third network, the first and third networks being associated with a first protocol and the second network being associated with a second protocol, and wherein a route associated with a data flow path between the first and fourth network devices is evaluated and, based on the data flow path, it is determined whether a translation of an address that identifies the fourth network device from the first protocol to the second protocol should be executed, the communication session may be directed to the second network device when the translation should not be executed in order to establish the data flow path, the name resolution service element may be accessed if the translation should be executed in order to translate the address from the first protocol to the second protocol such that information exchange in the data flow path is achieved between the first and fourth network devices.

21. The apparatus of claim 20, further comprising:
a table include within the name resolution service element and operable to store data that facilitates the resolution of the address to a selected one of the first and second protocols.

22. The apparatus claim 20, wherein the table in the name resolution service element is updated such that one or more addresses stored in the table may be resolved into a selected one of the first and second protocols.

23. The apparatus of claim 20, further comprising a memory element operable to provide instructions designating how to process the request to establish the communication session between the first and fourth network devices.

24. The apparatus of claim 20, wherein the name resolution service element is further operable to display information associated with the request to establish the communication session between the first network device and the fourth network device.

25. The apparatus of claim 20, further comprising a network interface operable to receive instructions designating how to process the request to establish the communication session between the first and fourth network devices.

* * * * *

UNITED STATES PATENT AND TRADEMARK OFFICE
CERTIFICATE OF CORRECTION

PATENT NO. : 6,724,724 B1
DATED : April 20, 2004
INVENTOR(S) : Swenson et al.

It is certified that error appears in the above-identified patent and that said Letters Patent is hereby corrected as shown below:

Title page,
Item [75], Inventors, after "Swenson", delete "San Jose", and insert -- Palo Alto. --.

Signed and Sealed this

Thirty-first Day of August, 2004

JON W. DUDAS
*Director of the United States Patent and Trademark Office*